(12) United States Patent
Jung et al.

(10) Patent No.: US 12,266,828 B2
(45) Date of Patent: Apr. 1, 2025

(54) COMPOSITE COATING LAYER FOR HOT BALANCE OF PLANT IN SOLID OXIDE FUEL CELL

(71) Applicant: KOREA ADVANCED INSTITUTE OF SCIENCE AND TECHNOLOGY, Daejeon (KR)

(72) Inventors: Woochul Jung, Daejeon (KR); Jinwook Kim, Daejeon (KR); Donghwan Oh, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 0 days.

(21) Appl. No.: 17/604,490

(22) PCT Filed: Apr. 19, 2021

(86) PCT No.: PCT/KR2021/004847
§ 371 (c)(1),
(2) Date: Feb. 24, 2022

(87) PCT Pub. No.: WO2022/039347
PCT Pub. Date: Feb. 24, 2022

(65) Prior Publication Data
US 2023/0387430 A1 Nov. 30, 2023

(30) Foreign Application Priority Data
Aug. 20, 2020 (KR) .................. 10-2020-0104948

(51) Int. Cl.
*H01M 8/04082* (2016.01)
*C25D 3/12* (2006.01)
(Continued)

(52) U.S. Cl.
CPC .......... *H01M 8/04201* (2013.01); *C25D 3/12* (2013.01); *C25D 7/04* (2013.01); *C25D 9/06* (2013.01);
(Continued)

(58) Field of Classification Search
None
See application file for complete search history.

(56) References Cited

U.S. PATENT DOCUMENTS 4,117,209 A * 9/1978 Markin ................. H01M 4/664
429/104
7,407,717 B2 * 8/2008 Tietz ................... H01M 8/0217
429/509
(Continued)

FOREIGN PATENT DOCUMENTS

JP H07-153469 6/1995
JP 2003-342751 12/2003
(Continued)

OTHER PUBLICATIONS

Jong Seol Yoon et al., "Lanthanum oxide-coated stainless steel for bipolar plates in solid oxide fuel cells (SOFCs)", Journal of Power Sources, 181(2):281-286, Feb. 12, 2008.
(Continued)

*Primary Examiner* — Seth Dumbris
(74) *Attorney, Agent, or Firm* — LEX IP MEISTER, PLLCv

(57) ABSTRACT

A composite coating layer for a solid oxide fuel cell member according to the present disclosure includes a nickel layer that coats at least a portion of the surface of the solid oxide fuel cell member, and a lanthanum oxide layer that coats at least a portion of the surface of the nickel layer, and thereby, has an effect of suppressing the volatilization of chromium
(Continued)

from the solid oxide fuel cell member even under high temperature and long-term conditions.

6 Claims, 2 Drawing Sheets

(51) Int. Cl.
  *C25D 7/04* (2006.01)
  *C25D 9/06* (2006.01)
  *H01M 8/12* (2016.01)
  *H01M 8/1246* (2016.01)
(52) U.S. Cl.
  CPC .. *H01M 8/1246* (2013.01); *H01M 2008/1293* (2013.01)

(56) References Cited

U.S. PATENT DOCUMENTS

| | | | | |
|---|---|---|---|---|
| 8,858,116 | B2* | 10/2014 | Lim | E01C 9/08 |
| | | | | 404/41 |
| 9,843,053 | B2* | 12/2017 | Sun | H01M 8/1231 |
| 2002/0098404 | A1* | 7/2002 | Shibata | H01M 4/8657 |
| | | | | 502/101 |
| 2006/0107997 | A1* | 5/2006 | Matsui | H01M 4/8673 |
| | | | | 429/111 |
| 2015/0240368 | A1* | 8/2015 | Lacopetti | C25B 1/04 |
| | | | | 204/252 |
| 2016/0064752 | A1* | 3/2016 | Kawakami | H01M 8/2485 |
| | | | | 429/513 |
| 2018/0191014 | A1* | 7/2018 | Son | H01M 8/04201 |
| 2019/0011074 | A1* | 1/2019 | Fuller | B32B 25/047 |

FOREIGN PATENT DOCUMENTS

| | | |
|---|---|---|
| JP | 2011-106914 | 6/2011 |
| JP | 4810617 | 11/2011 |
| JP | 2012-026967 | 2/2012 |
| JP | 2015-106445 | 6/2015 |
| JP | 2018-527698 | 9/2018 |
| KR | 10-2010-0133367 | 12/2010 |
| KR | 10-1595540 | 2/2016 |
| KR | 10-2017-0005798 | 1/2017 |
| KR | 10-2017-0010353 | 1/2017 |
| KR | 10-2018-0000449 | 1/2018 |
| KR | 10-2019-0036997 | 4/2019 |

OTHER PUBLICATIONS

KIPO, PCT Search Report & Written Opinion of PCT/KR2021/004847 dated Jul. 29, 2021.

* cited by examiner

[FIG. 1]
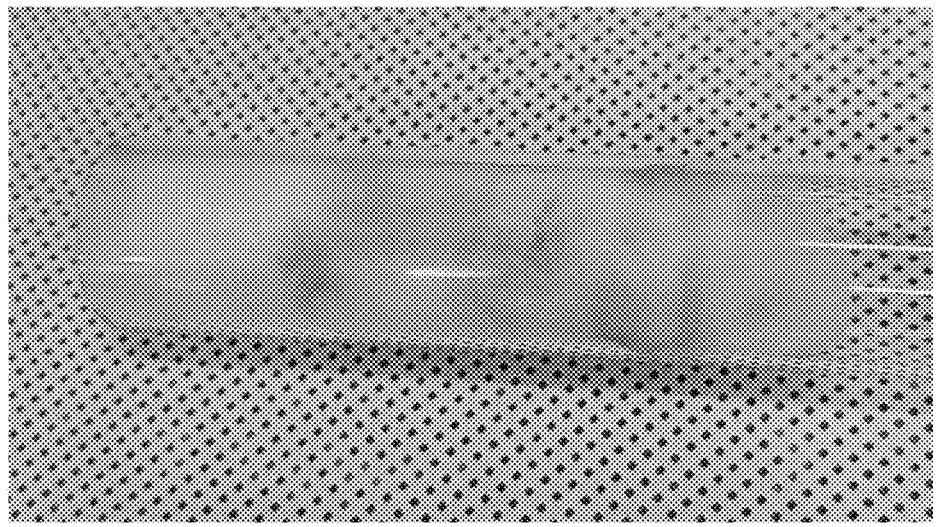
[FIG. 2]
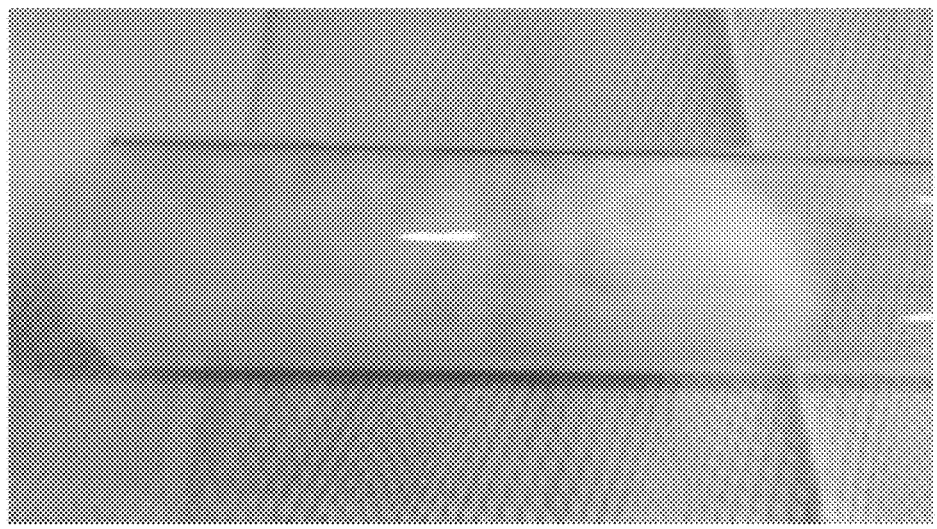

[FIG. 3]
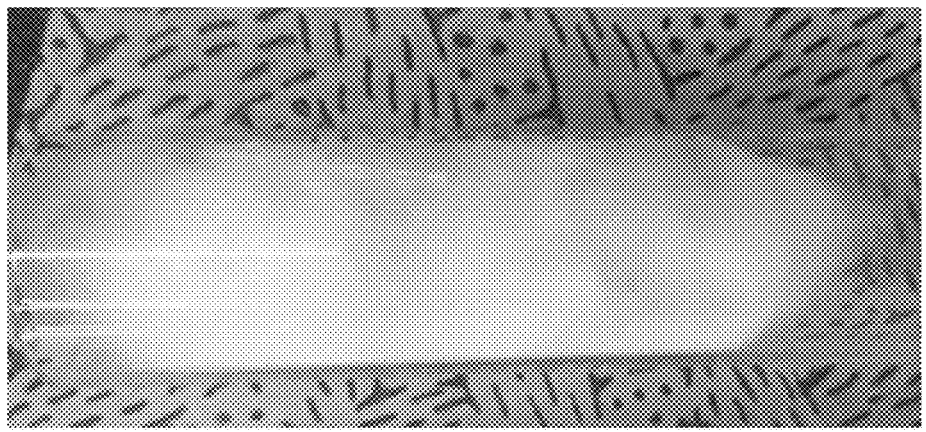
[FIG. 4]
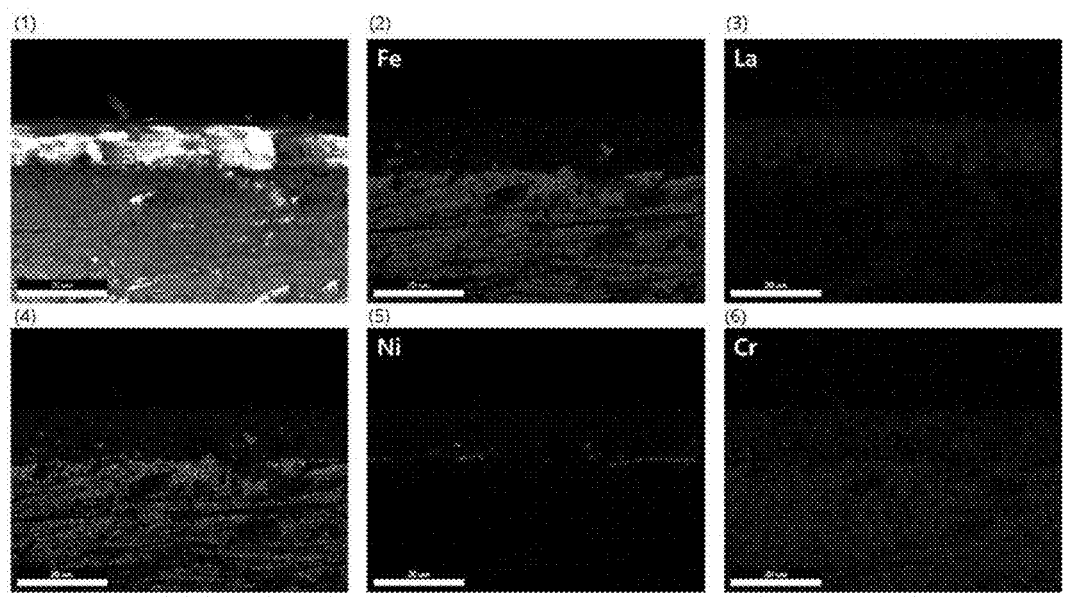

COMPOSITE COATING LAYER FOR HOT BALANCE OF PLANT IN SOLID OXIDE FUEL CELL

TECHNICAL FIELD

The present disclosure relates to a composite coating layer for Hot-BOP (balance of plant) in a solid oxide fuel cell.

BACKGROUND ART

Solid oxide fuel cells (SOFCs) are attracting a lot of attention as an environmentally friendly and high-efficiency energy production method. The SOFC system is largely composed of two parts. This is divided into members and stacks, and the member is composed of a portion exposed to high temperature and a portion which is not so. At this time, due to stack performance deterioration caused by by-products generated in gas pipe parts exposed to high temperature environment, that is, hot BOP, there is a great difficulty in commercialization.

BOP mainly uses SUS parts containing chromium and iron. When chromium is contained, chromium is volatilized from the BOP and adsorbed on the surface of the SOFC cell when high-pressure gas flows in under a high-temperature environment. This leads to chromium poisoning from the air electrode, blocking the catalytic reaction site on the electrode surface, or reacting with the electrode of perovskite structure, thereby causing formation of a non-conductive secondary phase, etc. and accelerating deterioration of electrode performance.

To solve these problems, it is necessary to suppress the phenomenon that chromium is volatilized by BOP even under high temperature and long-time conditions through BOP surface coating. Currently, the technology for suppressing chromium volatilization through BOP surface coating by various methods is being studied, and wet powder spraying technology has been reported as an effective technology for suppressing chromium volatilization.

Wet powder spraying is a simple technology that mixes a coating material with a binder, a solvent, etc., then sprays the mixture and applies a coating layer to the surface, which is a technique that is convenient and has great advantages for industrially producing a large amount of coating layer. However, the wet powder spraying has a disadvantage in that the amount of material used for introducing the coating layer is large and it is difficult to quantitatively control the uniformity of the coating layer.

Therefore, the present inventors have studied examples and methods of various coating layers in order to suppress chromium volatilization phenomenon from BOP, and as a result, found that a plating method capable of uniformly depositing a small amount on a three-dimensional structure in a short time was used as will be described later, whereby a nickel layer and a lanthanum oxide layer are sequentially coated onto the surface of the SUS pipe to effectively suppress the chromium volatilization phenomenon, thereby completing the present disclosure.

DETAILED DESCRIPTION OF THE INVENTION

Technical Problem

It is an object of the present disclosure to provide a complex coating layer for a solid oxide fuel cell member.

It is another object of the present disclosure to provide a hot-BOP of a solid oxide fuel cell coated with the composite coating layer.

Technical Solution

In order to achieve the above objects, according to one embodiment of the present disclosure, there is provided a composite coating layer for a solid oxide fuel cell member, the composite coating layer comprising: a nickel layer that coats at least a portion of the surface of the solid oxide fuel cell member, and a lanthanum oxide layer that coats at least a portion of the surface of the nickel layer.

Since solid oxide fuel cells operate at high temperatures for a long time, ceramics have been used as materials for various members in the past, but recently, metal materials are mainly used in consideration of workability and economy. In particular, chromium is used as one of the alloying elements in order to improve the properties of these metal materials, and ferritic stainless steel represented by SUS 430 steel is typically used.

However, there is a problem that chromium causes a chromium poisoning phenomenon that is volatilized at a high temperature and is adsorbed on the cell surface of the solid oxide fuel cell. Peripheral devices such as gas pipes, which are components of a solid oxide fuel cell, usually called members, are mainly used to prevent mixing of gas supplied to each electrode, but a hot gas comes into direct contact with the member and thus, chromium volatilization is more problematic.

Therefore, the present disclosure provides a composite coating layer for coating a solid oxide fuel cell member, and the composite coating layer according to the present disclosure is characterized in that the volatilization of chromium present in the solid oxide fuel cell member is suppressed even under high temperature and long-time conditions.

From these points of view, the solid oxide fuel cell member means a hot BOP even among stacks and BOPs constituting the solid oxide fuel cell, that is, a gas pipe exposed to high temperature environment, and preferably, it means a metal material member containing a chromium component. Also preferably, the solid oxide fuel cell member means a member of peripheral auxiliary devices of the solid oxide fuel cell.

The composite coating layer according to the present disclosure includes a nickel layer and a lanthanum oxide layer, wherein the nickel layer coats at least a portion of the surface of the solid oxide fuel cell member.

As used herein, the 'coating at least a portion' means that a whole or a part of the composite coating layer is formed on the solid oxide fuel cell member so that a whole or a part of the surface of the solid oxide fuel cell member is not directly exposed to the outside.

The nickel layer not only effectively coats the surface of the solid oxide fuel cell member, but also effectively coats the lanthanum oxide layer onto the nickel layer, and finally, a uniform lanthanum oxide layer is coated.

The nickel layer means that it is composed of only nickel element. Specifically, considering the purity and/or the range of error, the nickel layer means containing 99.0 wt. % or more, 99.1 wt. % or more, 99.2 wt. % or more, 99.3 wt. % or more, 99.4 wt. % or more, 99.5 wt. % or more, 99.6 wt. % or more, 99.7 wt. % or more, 99.8 wt. %, or 99.9 wt. % or more of nickel based on the total weight.

Preferably, the nickel layer has a thickness of 50 nm to 200 nm.

Meanwhile, the method for coating the nickel layer is not particularly limited, but as an example, an electrodeposition method, an electroless plating method, and the like can be used.

The lanthanum oxide layer coats at least a portion of the surface of the nickel layer coated onto the surface of the solid oxide fuel cell member, and suppresses volatilization of chromium from the solid oxide fuel cell member together with the nickel layer.

As in Examples and Comparative Examples described later, even when only the lanthanum oxide layer is coated, the volatilization of chromium can be suppressed to some extent, but when the nickel layer and the lanthanum oxide layer are coated together, the volatilization of chromium can be further suppressed. This is not theoretically limited, but when the lanthanum oxide layer is coated onto the surface of the solid oxide fuel cell member via a nickel layer, a more uniform lanthanum oxide layer is coated, thereby capable of further suppressing the volatilization of chromium.

Preferably, lanthanum oxide of the lanthanum oxide layer is $La_2O_3$.

The lanthanum oxide layer means that it is composed of only lanthanum oxide. Specifically, considering the purity and/or the range of error, the lanthanum oxide layer means containing 99.0 wt. % or more, 99.1 wt. % or more, 99.2 wt. % or more, 99.3 wt. % or more, 99.4 wt. % or more, 99.5 wt. % or more, 99.6 wt. % or more, 99.7 wt. % or more, 99.8 wt. % or more, or 99.9 wt. % or more of lanthanum oxide based on the total weight.

Preferably, the lanthanum oxide layer has a thickness of 100 nm to 10,000 nm.

Meanwhile, the coating method of the lanthanum oxide layer is not particularly limited, but as an example, an electrodeposition method, a sputtering method, a pulse laser deposition method, a screen printing, or the like can be used. In the case of using the electrodeposition method, the lanthanum oxide layer can be coated using a lanthanum precursor, and examples of the lanthanum precursor may include lanthanum nitrate (preferably $La(NO_3)_3$), lanthanum hydrochloride (preferably $La(Cl)_3$), and the like.

In addition, the present disclosure provides a solid oxide fuel cell member coated with the composite coating layer.

As the solid oxide fuel cell member according to the present disclosure, a solid oxide fuel cell member commonly used in the technical field to which the present disclosure pertains may be applied, except that the composite coating layer according to the present disclosure is coated.

As described above, since the composite coating layer according to the present disclosure has an effect of suppressing the volatilization of chromium, preferably, the solid oxide fuel cell member is a metal material member containing chromium.

In addition, since the high-temperature gas in the solid oxide fuel cell member comes into direct contact with the member of the peripheral auxiliary device of the solid oxide fuel cell, preferably, the solid oxide fuel cell member is a member of a peripheral auxiliary device of the solid oxide fuel cell.

Advantageous Effects

A composite coating layer for a solid oxide fuel cell member according to the present disclosure includes a nickel layer that coats at least a portion of the surface of the solid oxide fuel cell member, and a lanthanum oxide layer that coats at least a portion of the surface of the nickel layer, and thereby, has an effect of suppressing the volatilization of chromium from the solid oxide fuel cell member even under high temperature and long-term conditions.

BRIEF DESCRIPTION OF THE DRAWINGS

FIG. 1 shows the visual observation results of Quartz Wool for the degree of chromium volatilization of the cylindrical SUS of Example 1 of the present disclosure;

FIG. 2 shows the visual observation results of Quartz Wool for the degree of chromium volatilization of the cylindrical SUS of Comparative Example 1 of the present disclosure;

FIG. 3 shows the visual observation results of Quartz Wool for the degree of chromium volatilization of the cylindrical SUS of Comparative Example 2 of the present disclosure; and FIG. 4 shows the microstructure shape and EDS results of the cylindrical SUS of Example 1 of the present disclosure.

DETAILED DESCRIPTION OF THE EMBODIMENTS

Hereinafter, Examples and Experimental Examples of the present disclosure will be described in detail. These Examples and Experimental Examples are for explaining the present disclosure more specifically, and the scope of the present disclosure is not limited to these Examples and Experimental Examples.

Example 1

A coating layer was formed on SUS 430 used for manufacturing a solid oxide fuel cell stack by the following method.

Step 1) Surface Treatment

Cylindrical SUS (diameter: ¾ inch) was polished by using #320 light sandpaper. Then, the cylindrical SUS was exposed to a hydrofluoric acid (HF) aqueous solution diluted to a concentration of 1% for 4 hours, thereby performing surface treatment.

Step 2) Formation of Nickel Layer

Then, the Ni coating layer was introduced through the electroplating method. Specifically, boric acid was dissolved in a 1M nickel sulfate aqueous solution and a 0.2M nickel chloride aqueous solution to adjust the pH to about 4.0. The cylindrical SUS treated in step 1 was added as a negative electrode thereto, and a current of 5.4 $A/dm^2$ was applied to the cylindrical SUS at 50° C. At this time, the positive electrode was placed in nickel to perform a nickel electroplating. After electroplating, the cylindrical SUS was completely dried.

Step 3) Formation of Lanthanum Oxide Layer

Then, the cylindrical SUS treated in step 2 was immersed in 1M La nitrate aqueous solution, and then a voltage was applied. Specifically, deposition was carried out under deposition conditions of −1.1 V, total deposition charge of 4.0 C, and about 20 minutes, and it was confirmed that a stable $La_2O_3$ oxide was coated onto the surface. All deposition processes were performed at normal temperature (23° C.) and normal pressure (1 atm).

Comparative Example 1

A coating layer was formed by the same method, except that the Ni coating layer was introduced in Example 1, which was used as Comparative Example 1.

Comparative Example 2

A cylindrical SUS without any treatment was used as Comparative Example 2.

Experimental Example 1: Evaluation of Chromium Volatilization Inhibition Performance Using the cylindrical SUS prepared above, the degree of chromium volatilization was evaluated as follows.

Specifically, a cylindrical SUS was placed in the middle of the quartz tube, and one end was filled with Quartz Wool so that the Cr component volatilized from the SUS could be collected. The prepared tube was loaded into the furnace, and after flowing 5000 sccm air at 850° C. and exposing it to a deteriorated environment for 200 hours to generate chromium vapor, and then condensed and collected in Quartz wool at low temperature (15° C., cooling water circulation).

Through the color that appears due to chromium volatilization, it was qualitatively confirmed whether or not it was collected. The content of the chromium component collected through ICP-MS analysis was quantitatively analyzed according to the type and presence of the coating layer.

First, as shown in FIG. 1, each Quartz Wool was observed with the naked eye. As shown in FIG. 1, it was confirmed that in Comparative Example 2, the green chromium powder was collected, while in Examples and Comparative Example 1, chromium volatilization was suppressed from the cylindrical SUS.

Subsequently, in order to make a more accurate comparison, the amount of volatilized chromium in Example 1 and Comparative Example 1 was confirmed by ICP-MS analysis, and calculated by the following Equation, and the results are shown in Table 1 below. In the following Equation, a control group was based on Comparative Example 2.

$$\text{Rate of chromium volatilization decreased (\%)} = \frac{\text{Collection amount of chromium (control group)} - \text{Collection amount of chromium (experimental group)}}{\text{Collection amount of chromium (control group)}} \times 100$$

TABLE 1

|  | Rate of chromium volatilization decreased (%) |
|---|---|
| Example 1 | 95.50% |
| Comparative Example 1 | 53.91% |

As shown in Table 1, it was confirmed that when only the $La_2O_3$ coating layer was present, chromium volatilization was decreased by 53.91%, but when an additional Ni coating layer was introduced, it shows a high rate of chromium volatilization decreased of 95.50%. Therefore, it was confirmed that when $La_2O_3$ was coated onto the Ni coating layer, the most uniform oxide coating layer was introduced to effectively suppress chromium volatilization.

Experimental Example 2: Observation of Composite Coating Layer

The composite coating layer of the cylindrical SUS prepared in Example 1 was observed as follows.

First, the cross section of the cylindrical SUS was observed by SEM, and the result is shown in (1) of FIG. 4. As shown in FIG. 4(1), the presence and thickness of several coating layers deposited on the SUS can be confirmed.

Moreover, the cylindrical SUS was observed by SEM-Energy Dispersive Spectroscopy. Specifically, when an electron beam was scanned into a cylindrical SUS, the excited electrons in the element of the specimen were stabilized and a specific X-ray was emitted. At this time, because the intrinsic X-ray energy emitted for each element is different, component analysis is possible with this value. Therefore, as shown in (2), (3), (5), and (6) of FIG. 4, only the emission X-ray of a specific element was analyzed for each element (Fe, La, Ni, Cr), and the results are shown respectively.

For example, it can be confirmed that Fe is yellow and is located in the lower portion of the substrate, La is a red color, and is coated onto the upper part of the substrate. In addition, (3) of FIG. 4 shows the distribution of all elements together, and the distribution of each element can be confirmed by comparing it with (1) of FIG. 4.

The invention claimed is:

1. A solid oxide fuel cell member coated with a composite coating layer for a solid oxide fuel cell member, the composite coating layer comprising:
   a nickel layer that directly coats an entire surface of the solid oxide fuel cell member; and
   a lanthanum oxide layer that directly coats an entire surface of the nickel layer,
   wherein
   the nickel layer contains 99.0 wt. % or more of nickel based on the total weight of the nickel layer, and
   the lanthanum oxide layer contains 99.0 wt. % or more of lanthanum oxide based on the total weight of the lanthanum oxide layer.

2. The solid oxide fuel cell member of claim 1, wherein: the solid oxide fuel cell member is a metal material member containing chromium.

3. The solid oxide fuel cell member of claim 1, wherein: the nickel layer has a thickness of 50 nm to 200 nm.

4. The solid oxide fuel cell member of claim 1, wherein: lanthanum oxide of the lanthanum oxide layer is $La_2O_3$.

5. The solid oxide fuel cell member of claim 1, wherein: the lanthanum oxide layer has a thickness of 100 nm to 10,000 nm.

6. The solid oxide fuel cell member of claim 1, wherein: the solid oxide fuel cell member is a member of a peripheral auxiliary device of the solid oxide fuel cell.

* * * * *